March 17, 1959 R. J. HUDACHEK 2,877,993
ROTATION INDICATOR FOR WAX CHILLER
Filed March 5, 1956
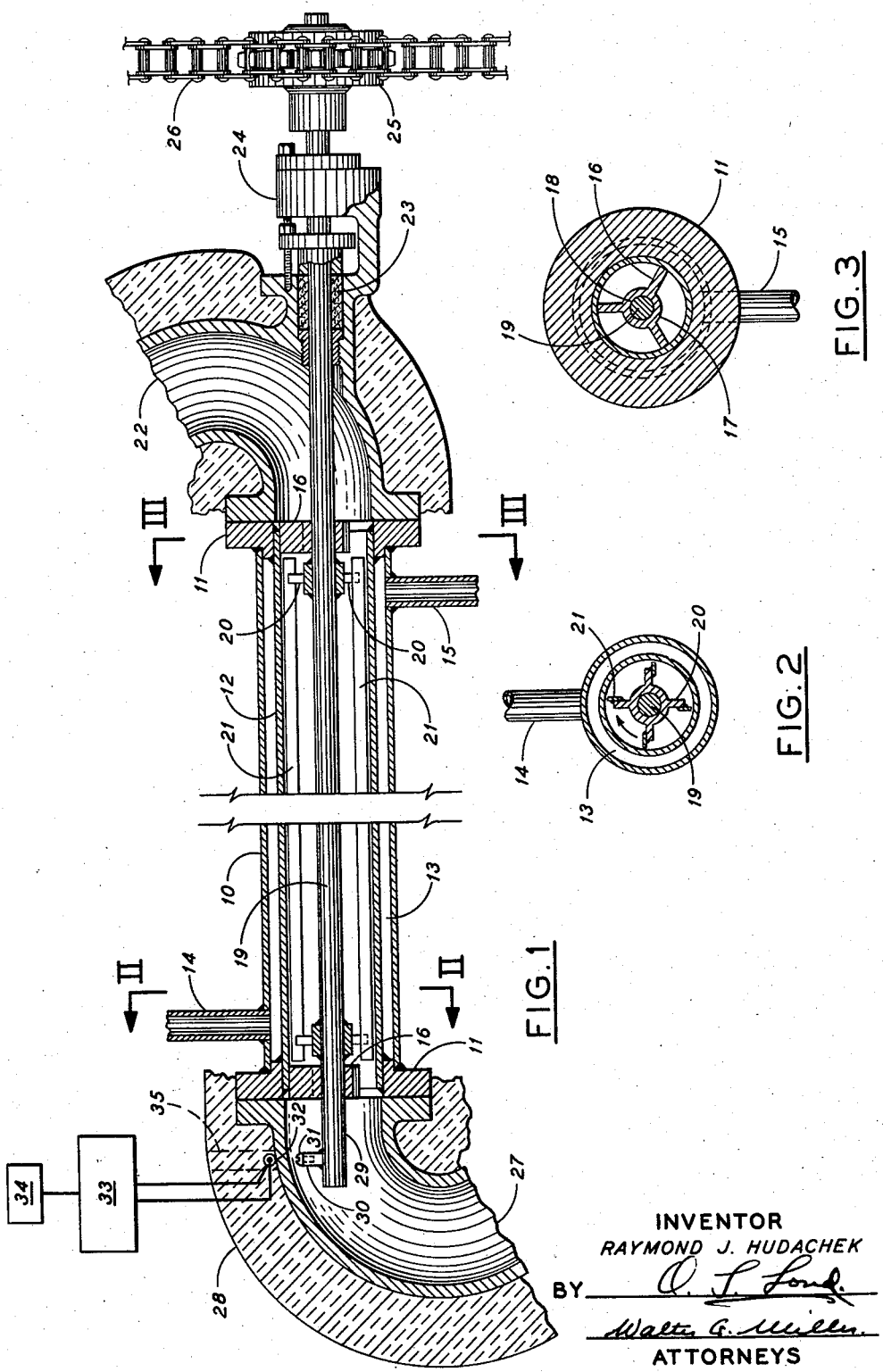
INVENTOR
RAYMOND J. HUDACHEK
BY
ATTORNEYS

United States Patent Office 2,877,993
Patented Mar. 17, 1959

2,877,993

ROTATION INDICATOR FOR WAX CHILLER

Raymond J. Hudachek, Orinda, Calif., assignor, by mesne assignments, to California Research Corporation, San Francisco, Calif., a corporation of Delaware Application March 5, 1956, Serial No. 569,419

2 Claims. (Cl. 259—1)

This invention relates to an apparatus for indicating rotation of an inaccessible member within a sealed housing or container, and particularly refers to a device which will indicate whether or not the entire length of the elongated shaft of a wax chiller scraper mechanism is operative or inoperative.

Wax chillers of the double-tube type pass a mixture of oil and wax through an inner tube surrounded by a confined body of refrigerating liquid. To prevent the building up of a layer of separated wax on the wall of the inner tube, a coaxial shaft extends through the tube and carries a plurality of longitudinally arranged scraper blades which are rotated slowly within the tube and close to its inner surface. The tubes of these devices are upwardly of 30–40 feet in length, so that considerable resistance to rotation is exerted by the scrapers on the shaft, which causes it to twist and oftentimes to break. These chilling tube units are generally mounted horizontally in parallel rows or banks and are heavily insulated due to the low temperature at which they must operate.

Heretofore, in order to indicate whether or not the entire length of the scraper shaft was rotating, an extension of that shaft was projected through a packing gland to a point where its remote end could be observed directly. Alternatively, the shaft carried a marker that was visible through a window which was periodically cleared of deposited wax with an internal mechanical wiper. These arrangements proved difficult to keep in a tight and operative condition, so that a number of the shafts of a unit could be broken intermediate their length and, hence, could be inoperative without the knowledge of the attendant.

In accordance with this invention, the remote end of the shaft opposite that at which the rotating means, usually a chain driven sprocket, is located, is provided with a radial projection carrying a small quantity of a radioactive material. This is generally positioned within the tangential portion of the heavy metal return bend which connects the inner tube of the wax chiller to the next adjacent tube. Outside of the return bend and generally within the thermal insulation which surrounds it is positioned a detector for radioactivity, which may be a Geiger tube, scintillation detector, or other suitable known device. The peak of radioactivity, which is periodically received by the detector as the shaft rotates, is suitably transformed thereby to an electrical signal and transmitted to an amplifier which may be connected to an indicating meter, a neon tube, or other type of alarm system. It is generally not contemplated that a record would be required, as the visual observation of the indicating system or a periodical scanning of the several detectors' outputs is usually sufficient for the purpose of the invention.

It is an object of this invention to provide a rotation indicator which is particularly adapted to locations where a rotating element is inaccessible to the usual types of rotation-indicating means. Another object is to provide a device which will not require elaborate packing systems or visual indicators which will include transparent members that require cleaning so that rotation may be observed therethrough.

Another object is to provide an element which may be attached to the shaft of a wax chiller and periodically scanned or examined, for example, by means of a portable detector for radioactivity, so that rotation of the way scraper shaft may be known.

These and other objects of the invention will be further apparent from the attached drawings, which illustrate a preferred embodiment, and from the accompanying specification which describes it in detail.

In the drawings:

Figure 1 is a longitudinal vertical sectional view of a single tube of a wax chiller assembly, illustrating the driving and scraping mechanism and the rotation detecting means of the invention.

Figure 2 is a transverse vertical sectional view on line II—II of Figure 1, illustrating the radial arrangement of scraper blades with respect to the axial shaft.

Figure 3 is a transverse vertical sectional view on line III—III of Figure 1, illustrating the supporting spider at the ends of the elongated tubes of the assembly.

Referring to the drawings, reference numeral 10 designates the outer pipe or housing of the wax chiller, provided at each end with a flange 11 within which is secured an inner pipe 12. Refrigerant liquid from any suitable source, which flows through the annulus 13 between pipes 10 and 12, is admitted through inlet connection 14 and is discharged from outlet 15. At each end of inner tube 12 is positioned a stationary spider 16 provided with a central boss 17 and a bore 18, to support a rotatable shaft 19 extending throughout tube 12. Between spiders 16 and secured to shaft 19 by radial arms 20 are a plurality of scraper blades 21 which traverse the entire inner surface of pipe 12 to remove the deposits of wax which would otherwise tend to adhere to that surface.

At the inlet end of inner pipe 12 and secured to the outer face of inlet flange 11 is a flanged return bend 22, having a packing gland generally designated 23, and a bearing 24 for shaft 19. A suitable drive means for shaft 19 is illustrated in this example as a drive sprocket 25 and chain 26, which is actuated by a prime mover, such as a motor (not shown).

At the opposite end of inner pipe 12 a conventional return bend 27 conveys liquid passing through pipe 12 to a parallel tubular arrangement such as the one just described. Both return bends and, if desired, outer pipe 10, are covered with a thick layer of heat insulation generally designated 28.

The remote end 29 of shaft 19, opposite its driven end, extends for a short distance into the tangential portion of return bend 27 and is provided with a radial extension 30, such as a short length of metal rod carrying at its outer end a radioactive element, which in this example is a machine screw, the end of which has been drilled out to receive a small piece of a radioactive substance, preferably a gamma emitter such as $Co^{60}$, which has a 5-year half-life, is secured and subsequently is covered by a protective layer, for example, of solder or brazing metal. The total activity of the radioactive element 31 is desirably so low, on the order of 1–10 microcuries, that no special shielding is required either while the element 31 is in place or when it is manually installed or removed. In other words, a single one of these elements may be handled with the bare hands for any reasonable length of time without special gloves, shields, or other precautions to protect the health of the individual handling it.

Outside of return bend 27 at any convenient place around its periphery and desirably aligned with the plane in which the radial extension 30 and radioactive element 31 will revolve is secured a suitable radiation detector 32, which may be a Geiger tube, scintillation detector, or other means responsive to the radiation from element 31. In this example, the detector 32 is shown as being permanently embedded in thermal insulation 28, through which electrical leads may be carried to a suitable amplifier 33 and indicator 34 of any desired type. Alternatively, a well or recess 35, indicated by dotted lines, may be left in the insulation, and a portable detector 32 may be periodically inserted therein for a period of time long enough so that the shaft rotation, which periodically carries the radioactive element in a circular path, will give an indication on the radioactivity pick-up unit.

The invention described above has proved quite satisfactory in several large installations where difficulty had previously been experienced in the mechanical indicators which are conventionally installed in this type of equipment. Although only a single example of the invention is illustrated, it is obvious that numerous changes could be made without departing from its essential features, and all those modifications that come within the scope of appended claims are intended to be embraced thereby.

I claim:

1. In combination with a wax chiller element comprising an elongated conduit having a bearing at each end, a shaft extending throughout said conduit and beyond said bearings, means at one end of said shaft to impart rotation thereto, scraper means on said shaft and located within the conduit, and a return-bend housing connected to said conduit in flow communication therewith and spaced from and enclosing the free end of said shaft opposite from said shaft-rotating means, said housing adapted to connect said conduit to the conduit of an adjoining chilling element, a rotation-indicating device for said shaft comprising a radial arm secured to the free end of said shaft inside of said housing, a radioactive source secured to said arm in close proximity to the inner face of said housing, and a detector for radiation adapted to be positioned adjacent to the outer face of said housing and aligned in the plane of rotation of said arm.

2. A combination according to claim 1 in which said radioactive source is a gamma emitter having an intensity of radiation of not over about 10 microcuries, whereby it may be handled manually without shielding.

References Cited in the file of this patent

UNITED STATES PATENTS

| | | |
|---|---|---|
| 1,363,368 | Sonsthagen | Dec. 28, 1920 |
| 1,837,565 | McDougall | Dec. 22, 1931 |
| 2,189,235 | Wanner | Feb. 6, 1940 |
| 2,671,174 | Burgholz | Mar. 2, 1954 |
| 2,692,951 | Voelker | Oct. 26, 1954 |

FOREIGN PATENTS

| | | |
|---|---|---|
| 815,352 | France | July 10, 1937 |